Figure 1:
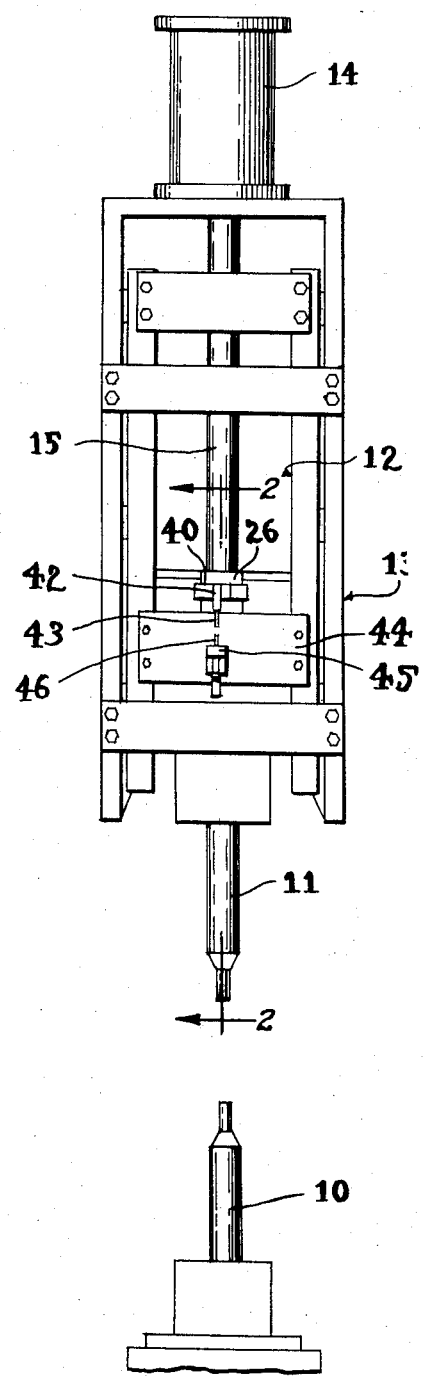

Nov. 10, 1959   J. F. DEFFENBAUGH ET AL   2,912,564
RESILIENT LOST-MOTION DEVICE FOR WELDING APPARATUS AND THE LIKE
Filed Nov. 21, 1957                            2 Sheets-Sheet 1

INVENTOR.
James F. Deffenbaugh
Irving R. Taylor
BY
*Michael Williams*
Attorney

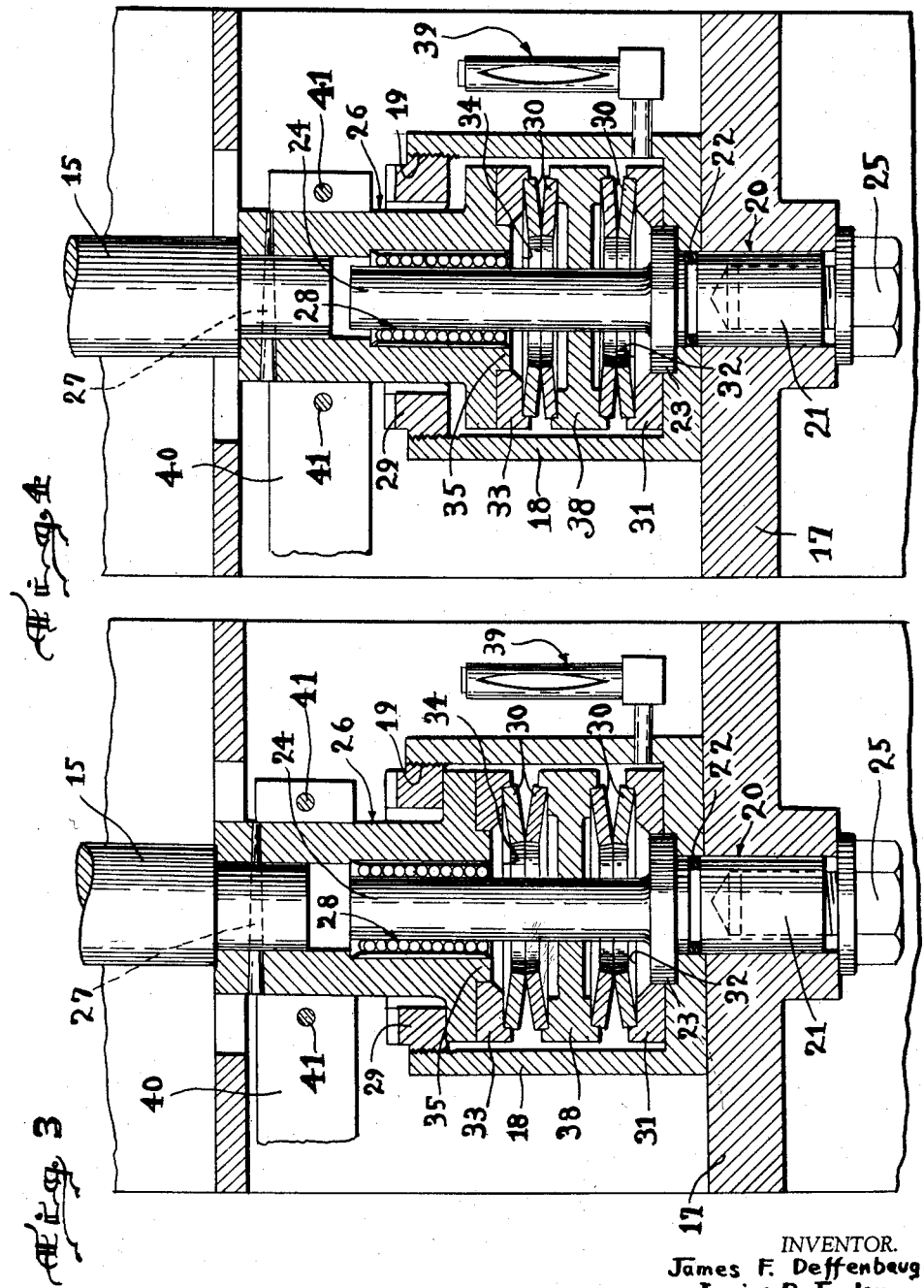

United States Patent Office 2,912,564
Patented Nov. 10, 1959

2,912,564

RESILIENT LOST-MOTION DEVICE FOR WELDING APPARATUS AND THE LIKE

James F. Deffenbaugh and Irving R. Taylor, Warren, Ohio, assignors to The Federal Machine & Welder Company Application November 21, 1957, Serial No. 697,872

6 Claims. (Cl. 219—89)

The present invention relates to resilient lost-motion devices, more particularly to resilient lost-motion devices for use with welding apparatus, and the principal object of the invention is to provide new and improved mechanisms of such character.

Many different types of apparatus employ a resilient lost-motion device of one construction or another and in most apparatus, the particular construction of the lost-motion devices is not critical. When, however, such devices are used in welding apparatus, their construction does become critical because of the high pressures involved, the necessity that the device be as nearly friction free as possible, the necessity that while its deflection must be small it must be exceedingly consistent and deflect precisely the same amount each time a given load is applied thereto, it must be reliable and operate for long periods of time with a minimum of maintenance and it must be relatively easy to change the load-deflection ratio when desired.

Figure 2:
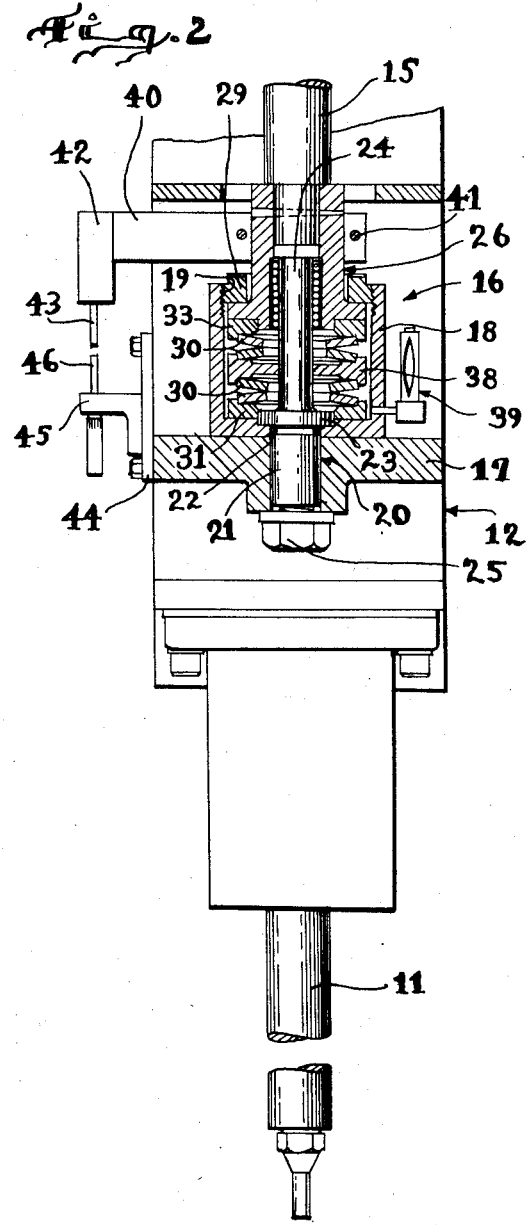

These and other advantages of the present invention will readily become apparent from a study of the following specification and from the drawings appended hereto and in the drawings accompanying this specification and forming a part of this application there is shown, for purpose of illustration, an embodiment which the invention may assume and in these drawings:

Figure 1 is a fragmentary front elevational view of welding apparatus which incorporates a preferred embodiment of the invention, Figure 2 is an enlarged, fragmentary sectional view generally corresponding to the line 2—2 of Figure 1, Figure 3 is a further enlarged view similar to Figure 2, and Figure 4 is a view similar to Figure 3 but with certain of the parts in another position.

The welding apparatus shown in Figure 1 is a more or less conventional spot welder having a fixed lower electrode 10 and a shiftable upper electrode 11 which is movable toward the lower electrode to clamp the work to be welded therebetween. It will be understood that after the work has been clamped between the electrodes, current will be passed from one to the other through the work to effect a weld.

In the present embodiment, upper electrode 11 is supported by a carriage 12 which is mounted for vertical reciprocatory movement relative to the frame 13 of the welder. Any suitable arrangement may be employed to provide for such slide movement; however, it is preferable that the mounting be such that minimum friction will be present to oppose slide movement. As herein disclosed, the means for effecting reciprocatory movement of slide 12 comprises a fluid cylinder 14 secured to housing 13 and having a piston rod 15 connected to the slide as will later be disclosed in detail.

Briefly, the piston rod is connected to the slide through a resilient lost-motion device primarily for two reasons: Firstly, the resilient lost-motion device provides for quick follow-up of the welding electrodes to maintain pressure on the work as the latter softens under the heat of the welding operation. Secondly, it provides for operation of the welding apparatus by means of "deflection firing" as disclosed in Letters Patent No. 2,460,759.

As seen in Figure 2, the resilient lost-motion device of the present invention through which piston rod 15 of cylinder 14 is connected to slide 12 is generally indicated by numeral 16. Welded or otherwise secured to and forming a part of slide 12 is an apertured cross member 17 and seated against cross member 17 is a cup-shaped member 18 which provides a housing for a purpose to be seen. In the position of parts shown, the open upper end of member 18 is provided with internal threads 19 and the closed lower end of the member is centrally apertured to pass a stud 20.

Stud 20 has a portion 21 which passes through the respective apertures in housing member 18 and in cross member 17 and such portion is grooved to receive an O sealing ring 22 which engages the housing and renders it fluid tight. For a purpose to be seen, stud 20 has a radially extending shoulder portion 23 and a portion 24 which extends upwardly through housing 18. Portion 21 of stud 20 is internally threaded to receive a cap-screw 25 whose head engages a washer seated against the underside of cross member 17 and which cap-screw draws shoulder 23 against housing 18 to thus secure the housing to the cross member 17.

Secured to piston rod 15 is a flanged member 26 which is centrally apertured to receive in its upper end a reduced diameter portion of the piston rod. A taper pin 27 or the like may be employed to secure flanged member 26 to the piston rod. Flanged member 26, as best seen in Figure 3 but as also shown in Figure 2, is adapted to be disposed within housing 18 with portion 24 of stud 20 within the lower portion of the member aperture. In order to provide for minimum frictional movement between flanged member 26 and stud 20 in a direction longitudinally of the stud, a commercially available ball bushing member 28 is pressed into the lower end of the flanged member. This arrangement is such that while flanged member 26 will be accurately guided during vertical movement along the stud, there will be an absolute minimum of friction therebetween. Engaged with threads 19 of housing 18 is an apertured cap 29 through which the shank of flanged member 26 extends. Cap 29, as will be apparent, prevents unintentional withdrawal of member 26 from the housing and also serves another purpose to later appear.

Interposed between flanged member 26 and the closed, lower end of housing 18 are resilient means which yieldably maintain the member and such housing end in spaced relation. As herein shown, such resilient means comprises a plurality of dished, apertured spring disks 30 herein shown to be four in number. These disks are preferably arranged in pairs in concentric relation about stud 20 with the convex sides of the respective disks of each pair in face to face abutting relation. Note that each disk aperture is materially larger than stud 20 so that the center portion of each disk is completely free to deflect without restraint.

It should be borne in mind that in welding apparatus of the type herein disclosed, it is essential that the resilient means deflect exactly the same amount each time a given force is applied thereto. Since such consistency can only be achieved if the spring disks are at all times positively maintained in concentric relation, the manner in which such concentricity is obtained is of the utmost importance. As herein disclosed, each disk 30 is adapted to be disposed in a seat provided by a respective recess whose defining walls closely engage respective disks and hold them against displacement. Such recesses are provided as follows:

Seated within housing 18 and against its closed end is an annular member 31 having an upwardly facing recess 32 for closely receiving the periphery of the adjoining spring disk 30 of one of the pairs of disks. Member 31 may be held in concentricity with stud 20 by any suitable means such as by closely engaging the shoulder 23 of the stud as shown. A member 33, similar to member 31, is carried by flange member 26 and such member 33 has a downwardly facing recess 34 for closely receiving the periphery of the adjoining disk of the other pair of disks. Member 33 may be located concentrically of stud 20 by closely engaging about a boss 35 provided by flanged member 26.

The remaining disks of the pairs of disks are closely receivable within respective upwardly and downwardly facing recesses 36, 37 formed in the opposite sides of an apertured spacer member 38 interposed between the pairs of spring disks. Spacer member 38 is maintained in concentricity with stud 20 by virtue of the defining walls of its aperture being closely engageable with portion 24 of the stud. For a purpose to become clear, spacer member 38 is slidable along the stud and although not shown, a suitable friction reducing bushing or the like may, if desired, be interposed between the spacer member and the stud. In the present embodiment, however, since member 38 has but very limited movement and since both the defining wall of the aperture in the member and the adjoining stud portion are highly polished, friction at this point is negligible.

For lubrication of the various moving parts within housing 18, the latter is adapted to be filled with a suitable lubricating oil or the like and a conventional sight glass 39 may be provided to indicate the lubricant level.

For a purpose to be seen, a bracket 40 is attached by suitable bolts 41 to flanged member 26 to project outwardly of welder slide 12 (see especially Figures 1 and 2). The free end of the bracket carries a suitable switch 42 having a depending actuator 43, and, secured to a cross piece 44 of the welder frame 13, is a bracket 45 which carries a vertically adjustable pin 46 in alignment with switch actuator 43. A suitable micrometer-like arrangement is provided for effecting vertical adjustment of pin 46 by exceedingly small increments.

Operation of the present resilient lost-motion device in conjunction with the welding apparatus herein disclosed will be as follows: with slide 12 elevated as shown in Figure 1, electrodes 10, 11 will be separated to permit the insertion therebetween of work to be welded. Fluid under pressure will then be admitted to cylinder 14 to urge slide 12 downwardly to clamp the work between the electrodes. Downward movement of slide 12 will be arrested upon engagement of electrode 11 with the work; however, under the force exerted by cylinder 14, piston rod 15 will move down, independently of the slide, to deflect and at least partially flatten the dished spring disks 30 (see Figure 4). When sufficient pressure has been exerted by cylinder 14 to perform a proper weld, such pressure being directly related to the amount of deflection of the spring disks 30, pin 46 will engage switch actuator 43 to trip switch 42 and cause welding current to flow between the electrodes. Obviously, in the event it is desired to weld at a greater or lesser pressure, pin 46 may be adjusted to trip the welder after a greater or lesser amount of deflection of the spring disks.

As previously mentioned, cap 29 prevents unintentional withdrawal of flanged member 26 from the housing 18; however, the cap also serves another function. By screwing the cap inwardly of the housing, spring disks 30 may be partially flattened and therefore subjected to any desired degree of preloading.

In the event it is desired to change the spring characteristics of the present resilient lost-motion device, it is only necessary to unscrew cap 29, withdraw flanged member 26 from the housing, and remove the two pairs of spring disks. Other spring disks having the desired spring characteristics may then be disposed in the housing and the device reassembled by reversing the above mentioned operations. Obviously, by proportioning the parts differently, a greater or lesser number of spring disks could be employed to still further change the device's spring characteristics.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. A resilient lost-motion device connecting a pair of relatively movable members, comprising a rod extending from one of said members into a socket formed in the other member, antifriction bearing means interposed between said rod and socket for providing low friction relative movement therebetween and for holding said members to movement toward and away from each other and coaxial with said rod and socket, a pair of dished spring disks surrounding said rod and disposed between said members for resiliently urging the latter apart, each disk having a center opening considerably larger than the rod diameter to freely pass the rod and obviate friction therebetween, said disks being disposed in side-by-side relation with their convex sides abutting at their center openings so that their peripheral portions are spaced, and means for holding said disks concentric with the axis of movement of said movable members during movement of the latter toward and away from each other comprising a pair of seat means fixedy movable with respective members and providing spaced facing annular seats each closely receiving the peripheral portion of a respective disk.

2. A resilient lost-motion device connecting a pair of relatively movable members, comprising a rod extending from one of said members slidably into a socket formed in the other of said members to hold said members to movement toward and away from each other in a manner coaxial with said rod and socket, two pairs of dished spring disks surrounding said rod and disposed between said members for resiliently urging the latter apart, each disk having a central aperture of a size considerably larger than the rod diameter to freely pass the rod and obviate friction therebetween, each pair of disks being disposed in side-by-side relation with their convex sides abutting at their central portions and thereby spacing their peripheral portions, and means for holding said disks concentric with the axis of movement of said movable members during movement of the latter toward and away from each other, comprising a pair of seat-providing portions movable with respective member and having annular seats in facing relation and a flat spacer member between said pairs of disks and apertured to fit around said rod in close sliding relation and having annular seats in opposite faces, the latter seats respectively facing the annular seats in said seat-providing portions and corresponding seats in a said portion and said spacer member closely receiving the peripheral portion of disks of a respective pair.

3. A movable electrode assembly for a low-inertia resistance welding machine having quick follow-up characteristics, comprising a vertically reciprocable lightweight slide carrying the movable electrode of said machine and a fluid motor having an operator for reciprocating said slide, and a connection between said slide and said motor operator comprising an up-right cup-shaped member having its bottom against said slide, a stud member having a lower portion securing said bottom to said slide and an upper portion extending axially and upwardly through said cup-shaped member, a socket secured to said fluid motor operator and having an anti-friction bearing into which said upper stud portion fits for vertical reciprocation, said socket having a flange disposed transversely within said cup-shaped member, and dished spring disks disposed for spring action between said socket flange and the bottom of said cup-shaped member, each disk having a central aperture to freely pass said upper stud portion and a peripheral portion held concentric with the stud axis, whereby relative movement between said motor operator and said slide when the movable electrode engages forcibly against said work causes said spring disks to deflect and store energy which constantly urge said slide in a direction against the receding work surface when the latter is softened by welding current.

4. The construction according to claim 3 wherein said upright casing member contains a lubricating oil.

5. The construction according to claim 3 wherein said disks are in pairs with each pair in side-by-side relationship and with their convex sides abutting at their central apertured portions.

6. The construction according to claim 3 wherein an electric switch is actuated by predetermined relative movement between said slide and said motor operator to effect passage of welding current between the electrodes of said welding machine.

References Cited in the file of this patent
UNITED STATES PATENTS

| | | |
|---|---|---|
| 2,263,107 | Smirl | Nov. 18, 1941 |
| 2,488,730 | Lake et al. | Nov. 22, 1949 |
| 2,776,851 | Heinrich | Jan. 8, 1957 |
| 2,821,380 | Strandberg | Jan. 28, 1958 |